United States Patent [19]

Bjordahl

[11] Patent Number: 5,666,252
[45] Date of Patent: Sep. 9, 1997

[54] FRONT PANEL FOR A MAGAZINE-LOADING TAPE DRIVE ASSEMBLY

[76] Inventor: James Bjordahl, 270 W. Camino Real, Arcadia, Calif. 91007

[21] Appl. No.: 279,306

[22] Filed: Jul. 22, 1994

Related U.S. Application Data

[63] Continuation of Ser. No. 953,639, Sep. 29, 1992, abandoned.
[51] Int. Cl.⁶ ............................................. G11B 33/02
[52] U.S. Cl. ............................ 360/137; 360/96.5; 49/386
[58] Field of Search .................................. 360/96.5, 96.6, 360/85, 93, 137; 49/386, 388, 397, 398, 399, 400

[56] References Cited

U.S. PATENT DOCUMENTS

| | | | |
|---|---|---|---|
| 3,800,328 | 3/1974 | Harlan et al. | 360/137 |
| 4,782,407 | 11/1988 | Hwang | 360/85 |
| 4,831,473 | 5/1989 | Yamada et al. | 360/96.5 |
| 4,835,636 | 5/1989 | Kanai et al. | 360/96.5 |
| 4,847,711 | 7/1989 | Inoue | 360/96.5 |
| 4,953,045 | 8/1990 | Taga | 360/96.5 |
| 5,089,920 | 2/1992 | Bryer et al. | 360/92 |

Primary Examiner—Robert S. Tupper
Assistant Examiner—William J. Klimowicz

[57] ABSTRACT

A front panel for a magazine-loading DAT drive assembly having a tape cassette drive unit above a magazine receiving area is provided with two hinged doors. By orienting two pairs of abutments in opposite directions and positioning two springs such that they exert opposite torques on their respective pairs of abutments, the door will be biased to its closed position regardless of whether it has been swung in one direction to its loading position, or in the other direction to its unloading position.

5 Claims, 4 Drawing Sheets

FRONT PANEL FOR A MAGAZINE-LOADING TAPE DRIVE ASSEMBLY

This is a continuation of application Ser. No. 07/953,639, filed Sep. 29, 1992, now abandoned.

TECHNICAL FIELD

The invention relates generally to a magazine-loading tape drive for storing digital data and more particularly to a front panel assembly for such a drive though which either entire magazines or single cassettes may be loaded into and removed from the drive.

BACKGROUND ART

Commonly assigned U.S. Pat. No. 5,089,920 discloses and claims a novel tape drive assembly that uses DAT (Digital Audio Tape) format cassettes and a high density DAT drive assembly, in which a plurality of cassettes are stored in a cassette tray located in a magazine holding area below the drive assembly, and a transport mechanism loads and unloads a selected cassette between the tray and the tape drive. In the known drive assembly, a front bezel is provided with two openings—an upper door through which single cassettes many be individually loaded and unloaded into the tape drive, and a lower door through which a ordered sequence of cassettes stored in a cassette tray may be loaded and unloaded into the magazine holding area below the tape drive. Although not shown in detail, the patent contemplates that when a cartridge is loaded and operating, the openings are blocked by a respective inwardly swinging hinged doors that are provided with a suitable electro-mechanical interlock mechanism.

However, in order to prevent such inwardly swinging doors from jamming during the unloading cycle, a relatively complex door operating mechanism is required that adds undesirable cost and complexity to the drive assembly.

Moreover, the required operating and/or interlock mechanism requires a mechanical and/or electrical connection between the bezel and the drive assembly that is prone to damage or misalignment during routine serving of the drive and transport mechanism behind the bezel.

SUMMARY OF THE INVENTION

Accordingly, it is an overall object of the present invention to avoid the limitations of the prior art by providing an improved front panel for a magazine-loading DAT drive assembly having access doors which are normally positively biased to a closed position, but are inwardly deflected to a loading position as the cassette or magazine is being manually inserted into the drive assembly behind the panel and which are outwardly deflected to an unloading position as the cassette or magazine is being ejected from the drive assembly to a position from which they may be manually removed.

In a preferred embodiment, each door is held in the closed position by a pair of coil springs mounted coaxially with respect to the pivot axis of the door such that a slight inward or outward displacement from the closed position will produce a sufficient torque from a respective one of the springs to return the door in its closed position unless a predetermined counter-torque continues to be provided by an external force.

DETAILED DESCRIPTION OF A PREFERRED EMBODIMENT

Figure 1:
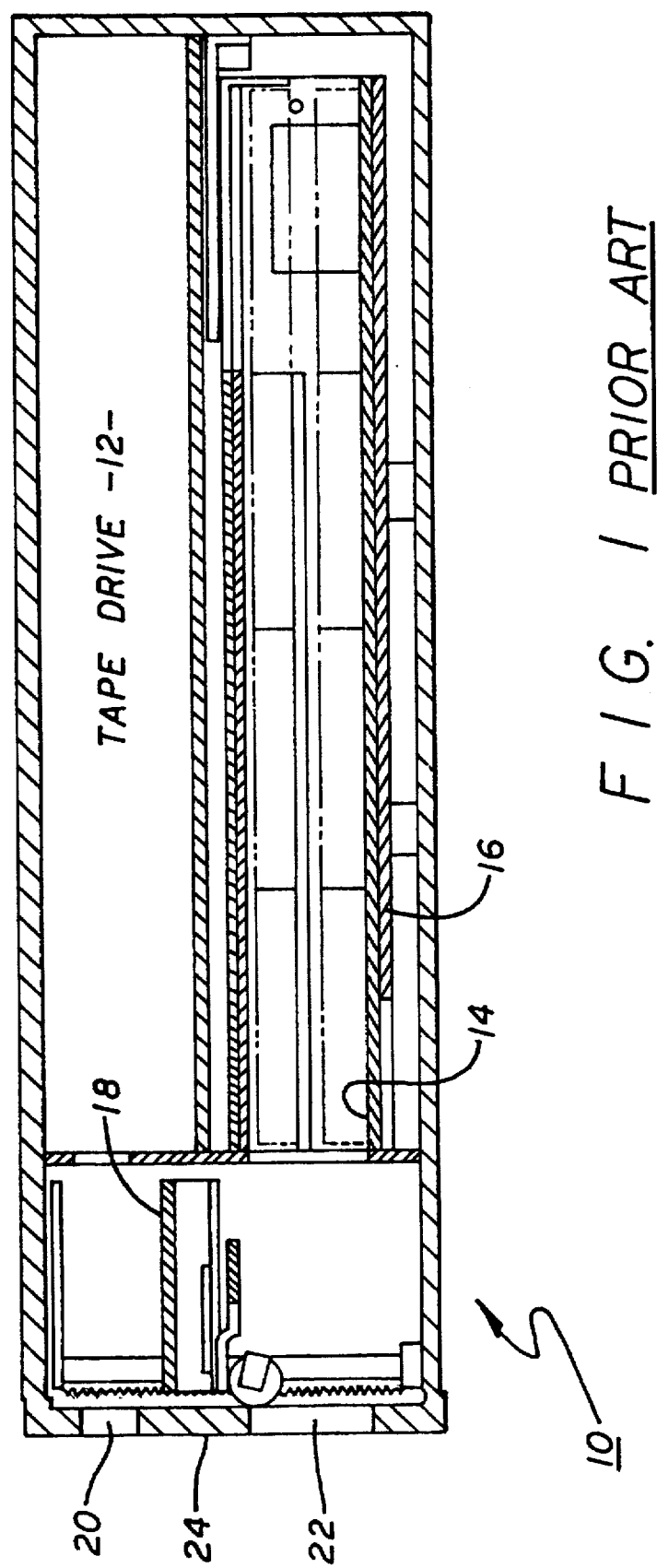
FIG. 1 is a cross-sectional view of a prior art magazine-loading DAT drive assembly showing the spatial relationship between various components thereof.

FIG. 1 is a simplified cross sectional view of a prior art magazine-loading DAT drive assembly 10 showing the spatial relationship between the tape drive 12, the tape cassette magazine 14, the magazine receiving area 16, transport mechanism 18, upper door 20 (associated with tape drive 12), lower door 22 (associated with magazine receiving area 16) and bezel 24.

Figure 2A:
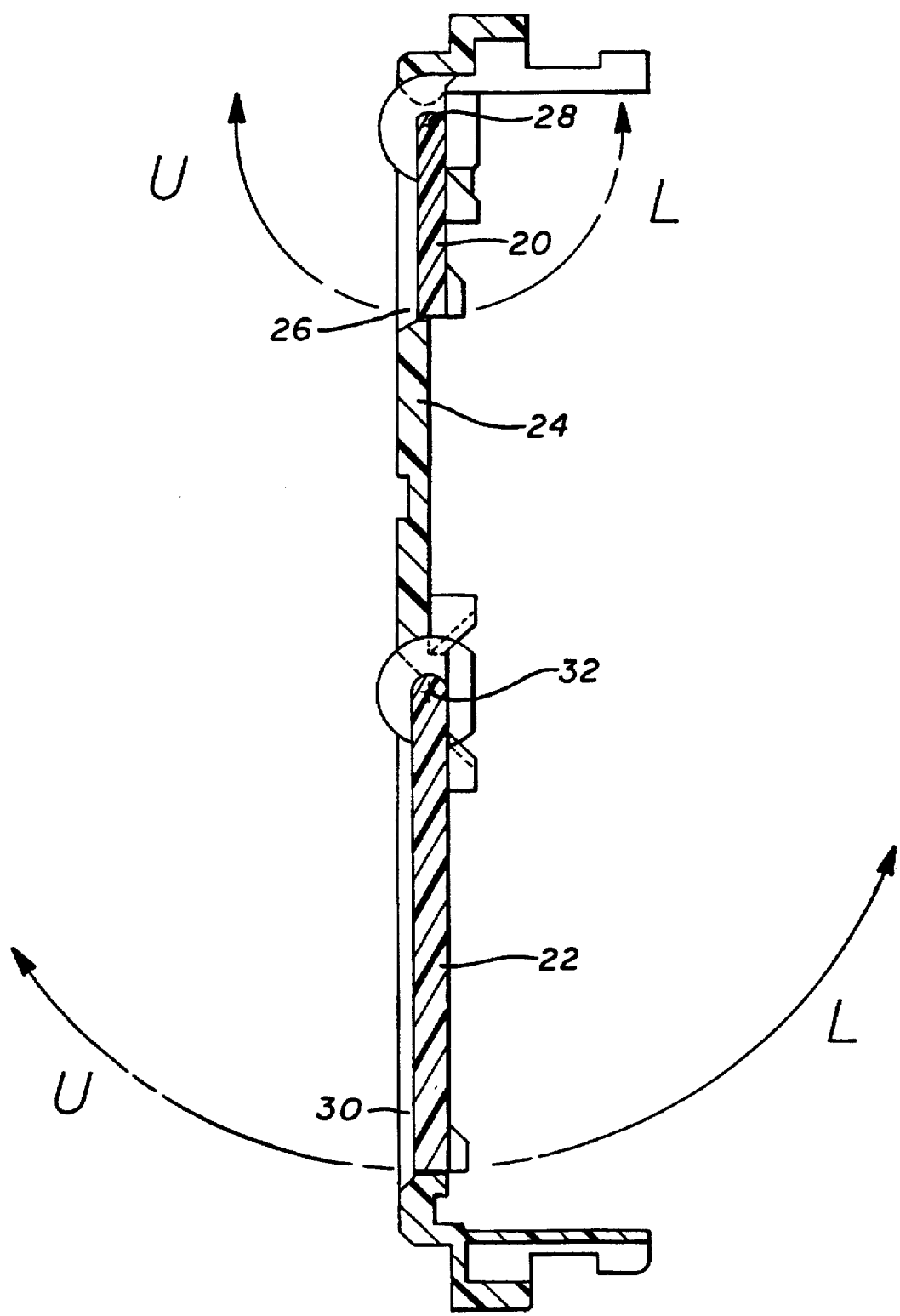
FIG. 2A is a cross-sectional view of the bezel constructed in accordance with the present invention.

FIG. 2A is a more detailed cross sectional view of bezel 24, constructed in accordance with the present invention. It will be noted that upper door 20 is pivoted to the upper edge of upper opening 26 by a pair of upper hinges 28 and that lower door 22 is similarly pivoted to the upper edge of lower opening 30 by means of a pair of lower hinges 32. Since each of the hinges 28, 32 is similar in construction, a representative example will later be discussed with reference to FIG. 3.

Figure 2B:
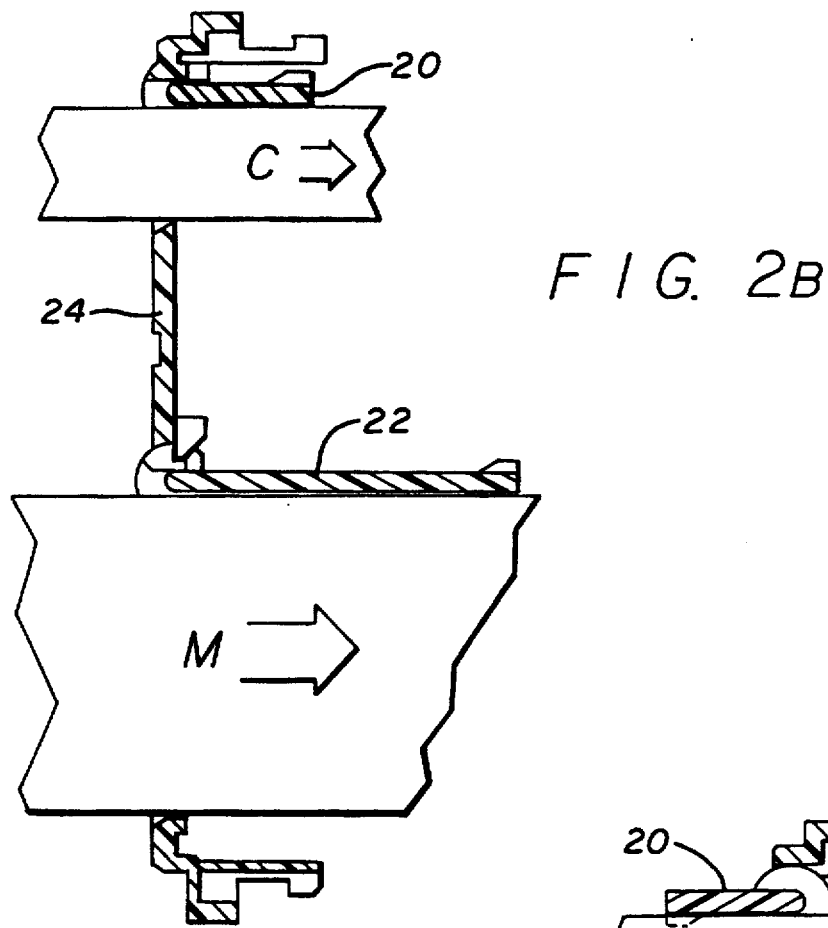
FIG. 2B shows the respective positions of the upper and lower doors of the bezel as a cassette or a magazine is inserted into the drive assembly.
Figure 2C:
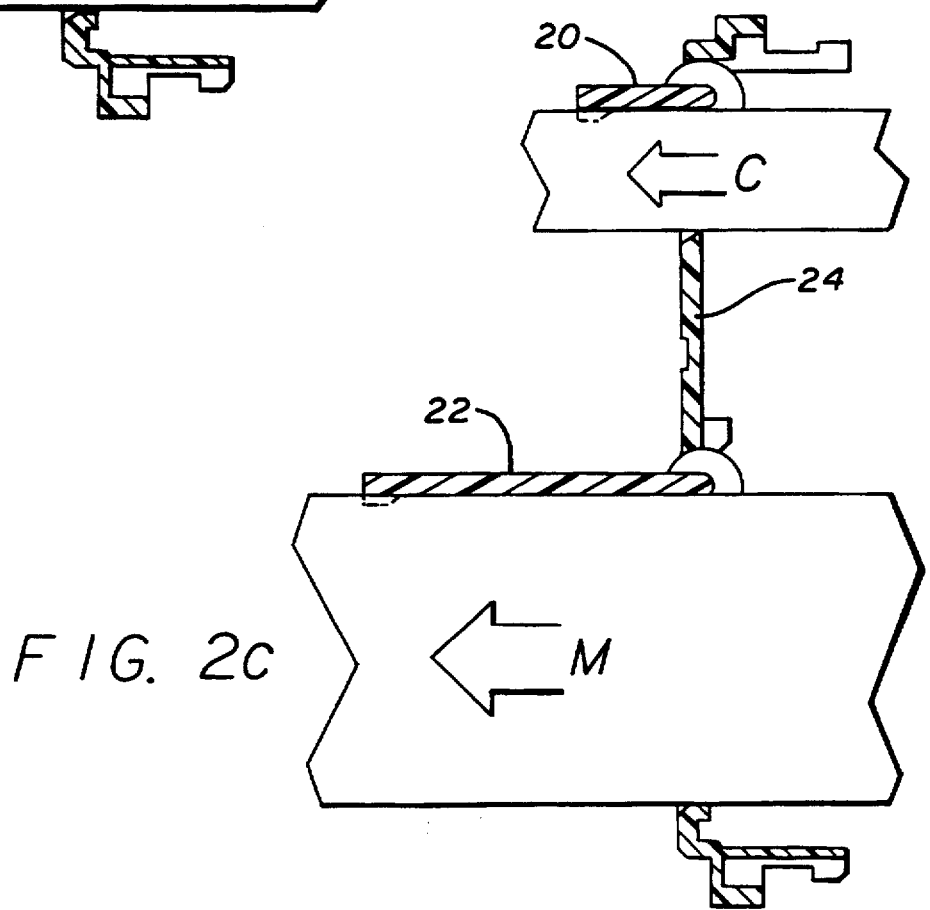
FIG. 2C shows the respective positions of the upper and lower doors of the bezel as a cassette or a magazine is being ejected from the drive assembly.

In accordance with the previously mentioned object of the present invention, upper door 20 and lower door 22 are normally positively biased to a closed position as shown in FIG. 2A, but as shown in FIG. 2B, each may be inwardly deflected to its respective loading position as the cassette C or magazine M is being manually inserted into the drive assembly 10 behind the bezel 24, or as shown in FIG. 2C, may be outwardly deflected to its unloading position as the cassette C or magazine M is being ejected from the drive assembly 10 to a position from which they may be manually removed.

Figure 3:
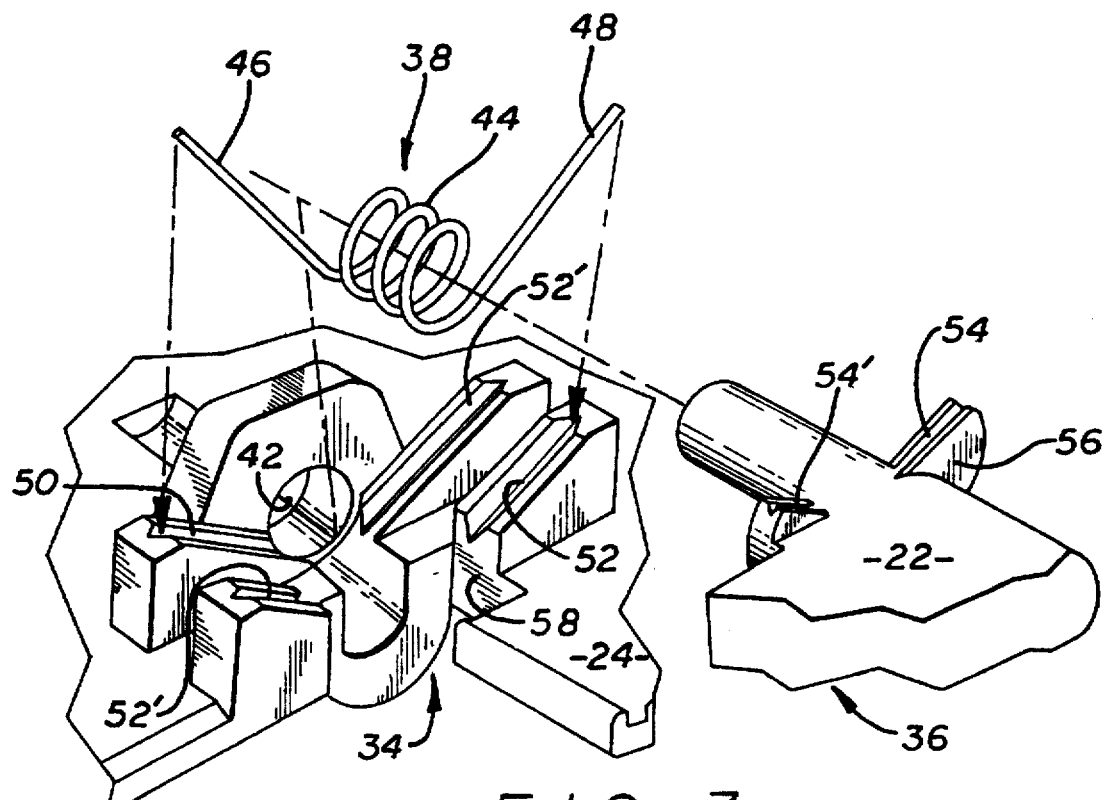
FIG. 3 shows a hinge for pivoting a door to an edge of either the cassette opening or magazine opening.

Reference should now be made to FIG. 3, which shows a representative hinge in the form of lower hinge 32, which includes a hinge bezel portion 34 associated with bezel 24, hinge door portion 36 associated with lower door 22, and a bias spring 38. Integrally molded at either top end of lower door 22 is a pivot axle 40 which rotates inside a corresponding pivot bearing 42 integrally molded adjacent each upper corner of lower hinge 32. As illustrated, bias spring 38 is in the form of a right-handed hairspring having a coiled portion 44, a fixed leg 46, and a moveable leg 48. When lower hinge 32 is assembled with pivot axle 40 inside pivot bearing 42 and coiled portion 44 mounted coaxially about pivot axle 40, the fixed leg 46 is held in position by fixed abutment 50 which is located adjacent pivot bearing 42 and which is also integrally molded with bezel 24; when lower door 22 is in its closed position, the torque from moveable leg 48 of bias spring 38 is received both by a second fixed abutment 52 adjacent lower door 22 and also integrally molded with bezel 24, and by a moveable abutment 54 in radial alignment (see FIG. 4) with second fixed abutment 52 but integrally molded with lower-door 22. In operation, as lower door 22 is rotated to its outwardly extending unloading position (as indicated by arrow U, see also FIG. 2C), moveable abutment 54 remains in contact with moveable leg 48 and winds up coiled portion 44, thereby receiving a counter-torque tending to bias lower door 22 to its closed position. On the other hand, when lower door 22 is rotated to its loading position (arrow L, FIG. 2B), moveable leg 48 is prevented from further movement by second fixed abutment 52 and no longer exerts any torque on moveable abutment 54.

Preferably, the front surfaces of hinge bezel portion 34 and hinge door portion 36 project in the vicinity of pivot bearing 42 and moveable abutment 54 to give additional strength to lower hinge 32. Moveable abutment 54 is preferably part of a semicircular boss 56 that is concentric with pivot axle 40 and extends forwardly and upwardly from lower door 22 and that is received within a corresponding recess 58 adjacent a matching semicircular boss 56' that extends forwardly from hinge bezel portion 34. Recess 58 cooperates with semicircular boss 56 to secure lower door 22 from unwanted lateral movement when lower door 22 is in its normal (closed) position.

Figure 4:
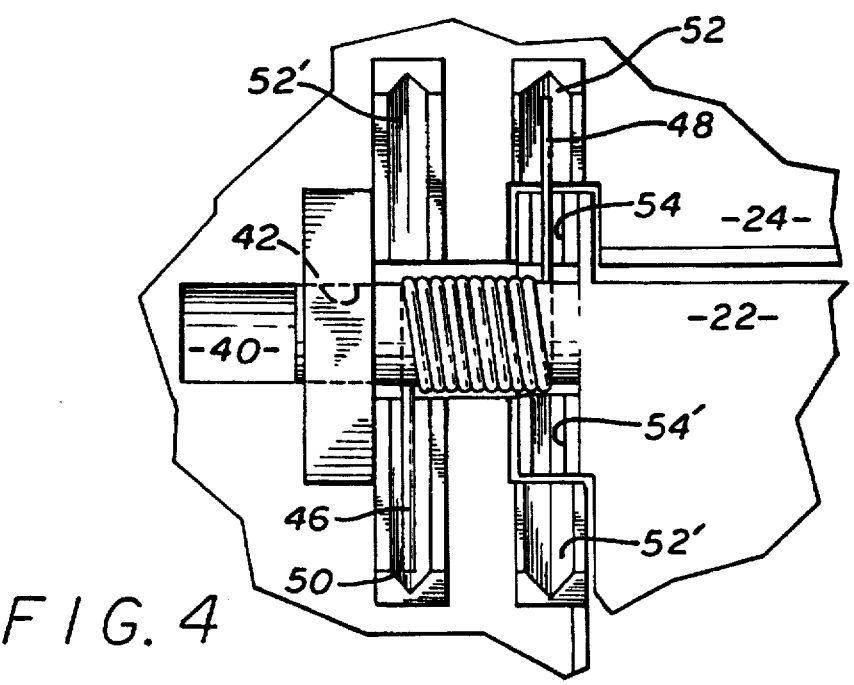
FIG. 4 shows a spring in the hinge of FIG. 3 for biasing a door to a closed position.

As shown in FIGS. 3 & 4, hinge bezel portion 34 and hinge door portion 36 are symmetrical in construction, being also provided with alternate first fixed abutment 50', alternate second fixed abutment 52', and alternate moveable abutment 54' which are positioned so as to cooperate with a left-handed bias spring 38' (not shown) to bias the lower door 22 to its closed position from its inwardly extending loading position (arrow L, FIG. 2B). Preferably, a corresponding (mirror image) hinge bezel portion 34 and hinge door portion 36 are provided at the other end of lower door 22, in which case a bias spring 38 at one end exerts a torque in one direction against moveable abutment 54 and a similar bias spring 38 at the other end will exert a countertorque in the other direction against loading fixed abutment 52'.

Although the invention has been described with reference to a particular preferred embodiment, it should be understood that many modifications will be apparent to those skilled in the art and its scope is to be limited only by the claims which follow.

What is claimed is:

1. A front panel for a magazine-loading DAT drive assembly, having a tape cassette drive unit above a magazine receiving area, said panel comprising:
   a first opening for manually loading and unloading a magazine containing a number of DAT cassettes to or from the magazine receiving area;
   a second opening for manually loadinq and unloading a single DAT cassette to or from the tape cassette drive unit;
   a first door pivotally mounted to said panel adjacent said first opening and having a closed position in which the door extends across its respective opening, a loading position in which the door is retracted into the DAT drive assembly in the direction of the magazine receiving area, and an unloading position in which the door extends out from the DAT drive assembly;
   a second door pivotally mounted to said panel adjacent said second opening and having a closed position in which the door extends across its respective opening, a loading position in which the door is retracted into the DAT drive assembly in the direction of the tape cassette drive unit, and an unloading position in which the door extends out from the DAT drive assembly; and
   a first and second bias means associated with each of the doors for normally holding the respective door in its closed position with sufficient torque such that it will remain closed regardless of the orientation of the panel, said first bias means biasing its associated door against movement towards said loading position and said second bias. means biasing said door against movement to said unloading position, the first bias means transmitting a torque to the door only when the door is between its closed position and its inner loading position and the second bias means transmitting a torque to the door only when the door is between its closed position and its outer unloading position, said first and second bias means each comprising:
   a hairspring having a fixed leg and a moveable leg;
   a primary fixed abutment fixed to said panel for holding said fixed leg in a fixed position relative to said panel;
   a secondary fixed abutment also fixed to said panel for receiving torque from said moveable leg when said respective door is between said closed position and a respective one of said loading and unloading positions; and
   a moveable abutment fixed to said respective door and radially aligned with said secondary fixed abutment and with said moveable leg when said door is in said closed position, for receiving said torque from said moveable leg when said door is between its closed position and the other of said loading and unloading positions,
   whereby when a magazine or cassette is being manually inserted through the respective opening, the magazine or cassette pushes the door inward into the loading position and the door is biased to its closed position by torque transmitted to the moveable abutment of the first bias means by the hairspring of the first bias means and all torque from the hairspring of the second bias means is received only by the secondary fixed abutment of the second bias means, and
   when the magazine or cassette is being ejected out of the opening, the magazine or cassette pushes the door outward into the unloading position and the door is biased to its closed position by torque transmitted to the moveable abutment of the second bias means by the hairspring of the second bias means and all torque from the hairspring of the first bias means is received only by the secondary fixed abutment of the first bias means.

2. The front panel of claim 1, wherein said first and second bias means each further comprises a pair of hinges, each of said hinges further comprising:
   a pivot axle integrally molded in said respective door;
   a pivot bearing for supporting said pivot axle, said pivot bearing being integrally molded in said panel;
   wherein said fixed leg and said moveable leg of each of said hairsprings are connected to each other by a coiled portion, said coiled portion being mounted coaxially about said pivot axle;
   wherein said primary fixed abutment is integrally molded in said panel adjacent said pivot bearing;
   wherein said secondary fixed abutment is integrally molded in said panel adjacent said pivot axle; and
   wherein said moveable abutment is integrally molded in said respective door adjacent said pivot axle.

3. The front panel of claim 2, wherein said primary fixed abutment, secondary fixed abutment and moveable abutment of said first bias means are on one side of said respective door and said primary fixed abutment, secondary fixed abutment and moveable abutment of said secondbias means are positioned on another side of said door, and said hairspring of said second bias means has an orientation identical to the said hairspring of said first bias means.

4. A front panel for a tape drive assembly, said panel comprising:

- a bezel in which is defined an opening for loading and unloading at least one cassette; said bezel having a first and second pivot bearing integral with an inside surface of said bezel and each displaced from opposing sides of said opening;
- a door, coupled to said bezel by a pivot axle which rotates inside said pivot bearings, pivotally mounted adjacent said opening and having a closed position in which said door extends across said opening, a loading position in which said door is retracted into the tape drive assembly, and an unloading position in which said door extends out from the tape drive assembly; and
- a first and second spring bias means for normally holding the door in its closed position with sufficient torque that it will remain closed regardless of the orientation of the panel, each of said first and second spring bias means further comprising:
  - a hairspring having a fixed leg and a moveable leg connected to each other by a coiled portion, said coiled portion being mounted coaxially about said pivot axle and said fixed and moveable legs extending in respective first and second planes generally perpendicular to said pivot axle;
  - a fixed abutment adjacent said pivot bearing and intersecting said first plane, for holding said fixed leg in a fixed radial position within said first plane;
  - a first torque receiving means adjacent said fixed abutment and said opening and intersecting said second plane, for receiving torque from said moveable leg when said door is rotated from its closed position to a respective one of said unloading or loading positions and
  - a second torque receiving means, radially aligned o with said first torque receiving means and with said moveable leq when said door is in said closed position, for receiving torque from said moveable leg when said door is rotated from its closed position to the other of said loading and unloadinq positions,
- whereby when a cassette is inserted through the opening, the cassette pushes the door inward into the loading position and the door is biased to its closed position by torque transmitted to the second torque receiving means of the first spring bias means by the hairspring of the first spring bias means and all torque from the hairspring of the second spring bias means is received only by the first torque receiving means of the second spring bias means, and
- when the cassette is being ejected out of the opening, the cassette pushes the door outward into the unloading position and the door is biased to its closed position by torque transmitted to the second torque receiving means of the second spring bias means by the hairspring of the second spring bias means and all torque from the hairspring of the first sprinq bias means is received only by the first torque receiving means of the first sprinq bias means.

5. The front panel of claim 4 wherein said door extends from said pivot axle in a first direction and said second torque receiving means comprises an abutment extending from said door proximate to said pivot axle in a second direction opposite to said first direction.

* * * * *

UNITED STATES PATENT AND TRADEMARK OFFICE
CERTIFICATE OF CORRECTION

PATENT NO. : 5,666,252
DATED : September 9, 1997
INVENTOR(S) : James Bjordahl

It is certified that error appears in the above-identified patent and that said Letters Patent is hereby corrected as shown below:

On the title page item [73] should read: --Longmont, Colorado--

At col. 2, line 64, please delete "lower-door" and insert --lower door--.
At col. 4, line 2, please delete the "." between "bias" and "means".
At col. 4, line 66, please delete "secondbias" and insert --second bias--.
At col. 5, line 11, please delete "adjacent-" and insert --adjacent--.
At col. 5, line 29, please delete "for-holding" and insert --for holding--.
At col. 6, line 4, please delete "aligned o" and insert --aligned--.
At col. 6, line 6, please delete "leq" and insert --leg--.
At col. 6, line 25, please delete "sprinq" and insert --spring--.
At col. 6, line 27, please delete "sprinq" and insert --spring--.

Signed and Sealed this

Thirteenth Day of January, 1998

Attest:

BRUCE LEHMAN

Attesting Officer

Commissioner of Patents and Trademarks